(12) United States Patent
Chan et al.

(10) Patent No.: US 8,355,220 B2
(45) Date of Patent: Jan. 15, 2013

(54) UPSTREAM SPOILER WITH INTEGRATED CRASH STOP

(75) Inventors: Andre Chan, Palo Alto, CA (US); Ferdinand Hendriks, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 448 days.

(21) Appl. No.: 12/637,523

(22) Filed: Dec. 14, 2009

(65) Prior Publication Data

US 2011/0141619 A1    Jun. 16, 2011

(51) Int. Cl.
G11B 17/02    (2006.01)
G11B 33/14    (2006.01)
G11B 21/08    (2006.01)

(52) U.S. Cl. .................. 360/97.15; 360/265.1

(58) Field of Classification Search .............. 360/97.01, 360/97.02, 97.03, 98.01, 97.13, 97.15, 265.1
See application file for complete search history.

(56) References Cited

U.S. PATENT DOCUMENTS

| | | | |
|---|---|---|---|
| 5,060,100 A | 10/1991 | Mihara et al. | |
| 5,140,578 A | 8/1992 | Tohkairin | |
| 5,319,511 A * | 6/1994 | Lin ........................... | 360/256.1 |
| 5,369,538 A | 11/1994 | Moe et al. | |
| 5,602,700 A * | 2/1997 | Viskochil et al. .......... | 360/256.1 |
| 5,715,119 A | 2/1998 | Williams et al. | |
| 5,768,058 A | 6/1998 | Hofland | |
| 5,793,572 A * | 8/1998 | Lalouette et al. .......... | 360/256.1 |
| 5,898,545 A | 4/1999 | Schirle | |
| 6,600,625 B1 | 7/2003 | Munninghoff et al. | |
| 7,006,324 B1 * | 2/2006 | Oveyssi et al. ............ | 360/97.13 |
| 7,027,259 B2 | 4/2006 | Myokan et al. | |
| 7,119,992 B2 * | 10/2006 | Miyamoto et al. ......... | 360/256.4 |

(Continued)

FOREIGN PATENT DOCUMENTS

JP    2008047165 A    2/2008

OTHER PUBLICATIONS

Hiroshi Mukai et al., "Decreasing Airflow Velocity in Hard Disk Drives with a Spoiler and Bypass," Nihon Kikai Gakkai Nenji Taikai Koen Ronbunshu, 2006, vol. 5, pp. 655-656, available online at http://sciencelinks.jp/j-east/article/200703/000020070306A0888478.php, printed Oct. 12, 2009.

(Continued)

*Primary Examiner* — Jefferson Evans
(74) *Attorney, Agent, or Firm* — Brokaw Patent Law PC; Christopher J. Brokaw

(57) ABSTRACT

Approaches for a single part that comprises an upstream spoiler and a crash stop for use within a hard-disk drive (HDD). The integrated upstream spoiler and crash stop has one or more wings which diverts and reduces the flow of air, resulting from the rotation of the magnetic-recording disks within the HDD, from a magnetic-recording head of the HDD. The integrated upstream spoiler and crash stop has a structure that also prevents the actuator from moving beyond a particular location. After the integrated upstream spoiler and crash stop has been affixed within the HDD, the one or more wings may be rotated between the one or more magnetic-recording disks into a desired position.

19 Claims, 6 Drawing Sheets

U.S. PATENT DOCUMENTS

| | | | |
|---|---|---|---|
| 7,545,600 B2* | 6/2009 | Sorrell et al. | 360/97.2 |
| 7,944,644 B2* | 5/2011 | Kaneko et al. | 360/97.13 |
| 2003/0086208 A1* | 5/2003 | Hong et al. | 360/256.1 |
| 2005/0264941 A1* | 12/2005 | Tsuda et al. | 360/256.2 |
| 2008/0043369 A1 | 2/2008 | Takemori et al. | |
| 2008/0068746 A1 | 3/2008 | Kaneko et al. | |
| 2009/0034125 A1 | 2/2009 | Chan et al. | |

OTHER PUBLICATIONS

S. Kirpekar, "A Study on the Efficacy of Flow Mitigation Devices in Hard Disk Drives," IEEE Transactions on Magnetics, vol. 42, No. 6, pp. 1716-1729, Jun. 2006, available online at http://ieeexplore.ieee.org/stamp/stamp.jsp?arnumber=1634483&isnumber=34272.

* cited by examiner

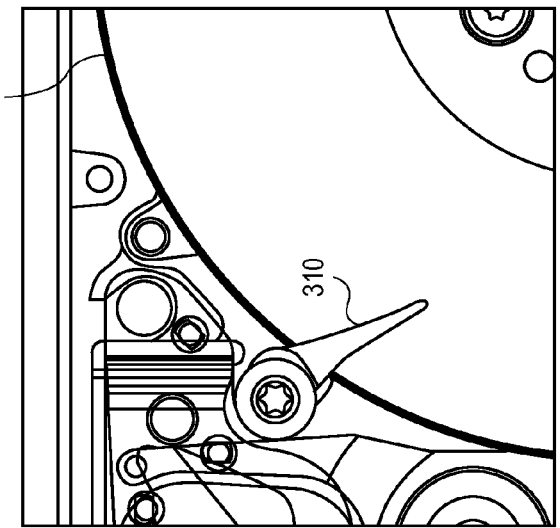
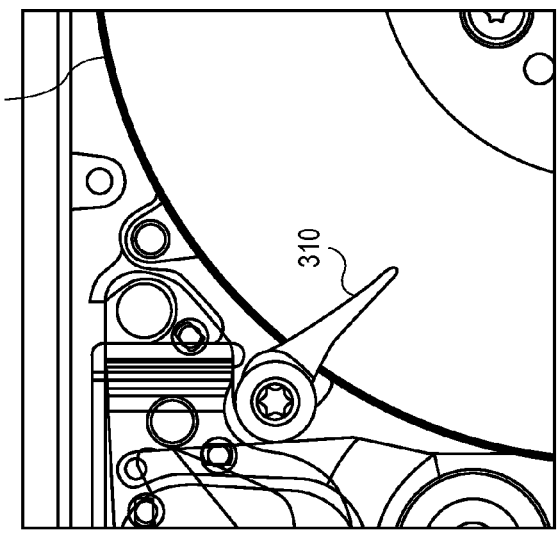
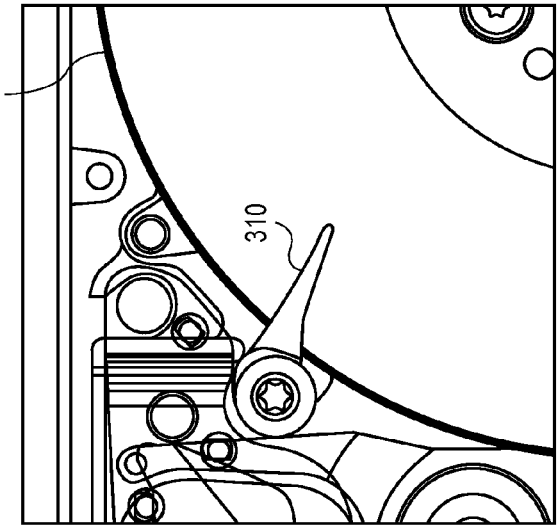

UPSTREAM SPOILER WITH INTEGRATED CRASH STOP

FIELD OF THE INVENTION

Embodiments of the invention relate to integrating an upstream spoiler with a crash stop within a hard-disk drive (HDD).

BACKGROUND OF THE INVENTION

A hard-disk drive (HDD) is a non-volatile storage device which is housed in a protective enclosure and stores digitally encoded data on one or more circular platters having magnetic surfaces. When an HDD is in operation, each platter is rapidly rotated by a spindle system. Data is read from and written to a platter using a read/write head which is positioned over a specific location on a platter by an actuator.

A read/write head uses a magnetic field to read data from and write data to the surface of the platter. As a magnetic dipole field decreases rapidly with distance from a magnetic pole, the space between a read/write head and the surface of a platter must be tightly controlled. To provide a uniform distance between a read/write head and the surface of a platter, an actuator relies on air generated by a self-acting air bearing surface to support the read/write heads at the proper distance away from the surface of a platter while the platter rotates. A read/write head therefore is said to "fly" over the surface of a platter. That is, the air pulled along by a spinning platter forces the head away from the surface of the platter. When a platter stops spinning, a read/write head must either "land" on the platters or be pulled away.

To prevent the actuator from inadvertently moving too far in one direction, a physical barrier, known as a crash stop, may be placed within the interior of the hard-disk drive (HDD). A crash stop is typically constructed using a cylindrical piece of rubber. The placement of the crash stop within the interior of the hard-disk drive (HDD) may vary from implementation to implementation, although its position should prevent the actuator from making physical contact with the protective enclosure, or other components, of the hard-disk drive (HDD). In this way, if the hard-disk drive (HDD) is accidently dropped or otherwise receives a mechanical shock, the crash stop helps prevent the actuator from making unwanted contact with other physical components within the hard-disk drive (HDD), which could damage those components or cause harmful airborne particles to be introduced within the interior of the hard-disk drive (HDD).

As the rate of the air flow circulating within the enclosure of the HDD increases, the likelihood that the circulating air flow will disturb the position, and thus the operation, of the magnetic read/write head also increases. To prevent or minimize the disruption caused by the circulating flow of air, the actuator is typically protected by an upstream spoiler which helps divert the flow of air away from the actuator. The diverter also reduces the magnitude of the circulating air flow. The physical dimensions of most HDD models have decreased in size over time. Unfortunately, due to the lack of available space for positioning and affixing the upstream spoiler during the manufacturing of an HDD, installing upstream spoilers within HDDs has become increasingly complex and burdensome.

SUMMARY OF THE INVENTION

Techniques are provided for integrating an upstream spoiler with a crash stop in a hard-disk drive (HDD). According to an embodiment of the invention, an HDD includes a single integrated part that comprises an upstream spoiler and a crash stop. The upstream spoiler has one or more wings. The shape of the upstream spoiler diverts and reduces the flow of air, resulting from the rotation of the magnetic-recording disks within the HDD, from a magnetic-recording head of the HDD. The crash stop prevents the actuator from moving beyond a particular location, thus preventing the actuator and/or the read/write head from potentially becoming damaged by inadvertent contact with a portion of the HDD. After the single integrated part is affixed within the HDD, the one or more wings of the upstream spoiler may be rotated between the one or more magnetic-recording disks into a desired position.

Advantageously, the use of a single integrated part comprising an upstream spoiler and a crash stop yields a variety of benefits. HDDs employing embodiments of the invention need not employ a separate upstream spoiler and crash stop. As a result, the integrated upstream spoiler and crash stop according to embodiments of the invention may be installed within a smaller physical space than prior approaches. Moreover, embodiments of the invention may be implemented and installed with less time and potentially less cost than prior approaches.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 6A-C are illustrations of several illustrative positions of the spoiler wings of a single part comprising an upstream spoiler and a crash stop according to embodiments of the invention.

DETAILED DESCRIPTION OF THE INVENTION

Approaches for implementing an upstream spoiler with a crash stop using a single integrated part within a hard-disk drive (HDD) are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Physical Description of Illustrative Embodiments of the Invention

Figure 1:
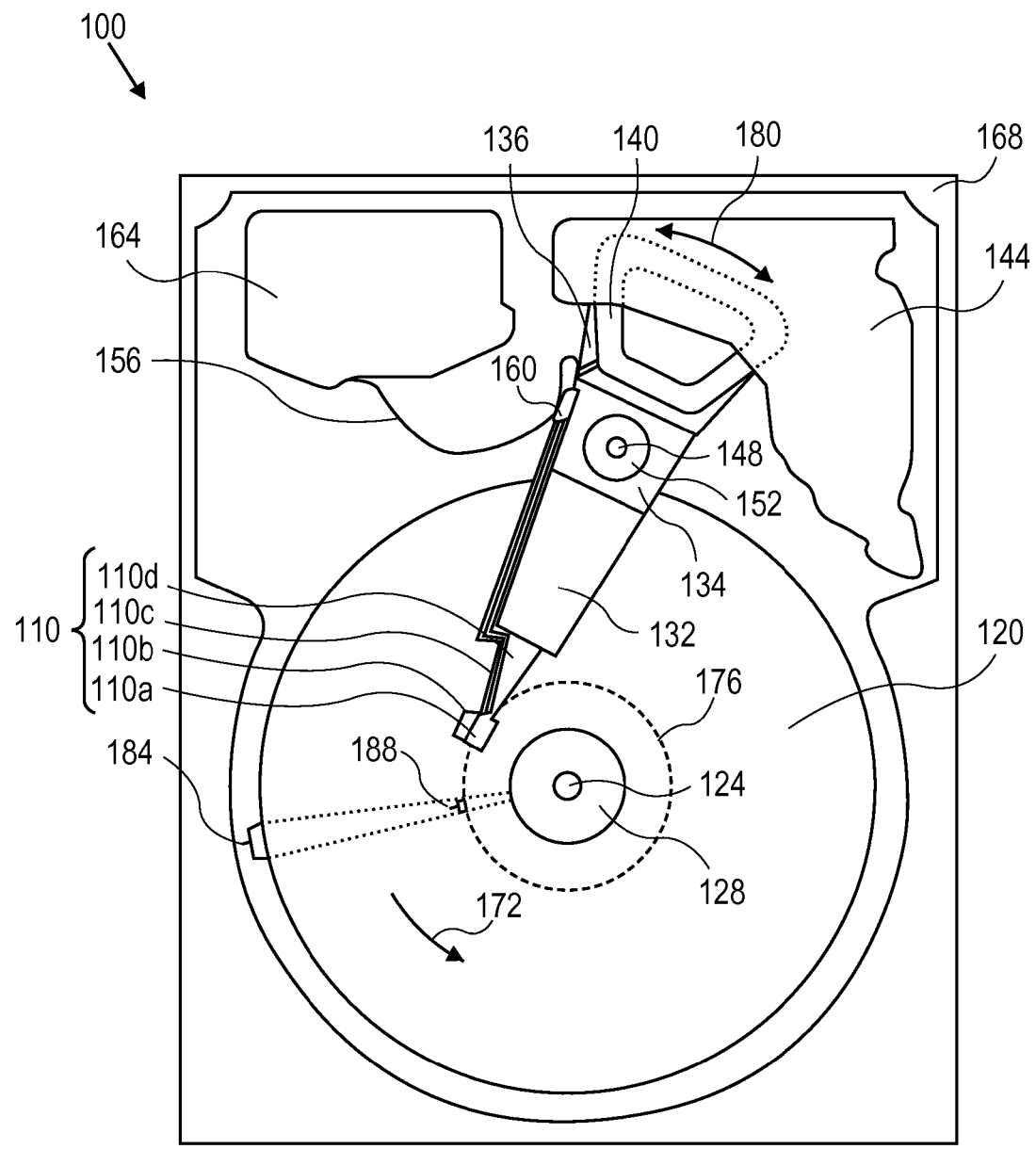
FIG. 1 is an illustration of a plan view of an HDD according to an embodiment of the invention.

To illustrate the operation of an integrated upstream spoiler and crash stop according to an embodiment of the invention, an illustrative hard-disk drive (HDD) in which an integrated upstream spoiler and crash stop may be implemented shall now be explained. With reference to FIG. 1, in accordance with an embodiment of the present invention, a plan view of a HDD 100 is shown. FIG. 1 illustrates the functional arrangement of components of the HDD including a slider 110b including a magnetic-recording head 110a. The HDD 100 includes at least one HGA 110 including the head 110a, a lead suspension 110c attached to the head 110a, and a loadbeam 110d attached to the slider 110b, which includes the head 110a at a distal end of the slider 110b; the slider 110b is attached at the distal end of the loadbeam 110d to a gimbal portion of the loadbeam 110d. The HDD 100 also includes at least one magnetic-recording disk 120 rotatably mounted on a spindle 124 and a drive motor (not shown) attached to the spindle 124 for rotating the disk 120. The head 110a includes a write element, a so-called writer, and a read element, a so-called reader, for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals (for example, current to the voice coil 140 of the VCM, write signal to PMR head 110a, and read signal from the PMR head 110a) are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 entrains air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120.

Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the present invention also encompass HDD 100 that includes the HGA 110, the disk 120 rotatably mounted on the spindle 124, the arm 132 attached to the HGA 110 including the slider 110b including the head 110a. Therefore, embodiments of the present invention incorporate within the environment of the HDD 100, without limitation, the subsequently described embodiments of the present invention for integrating an upstream spoiler with a crash stop as further described in the following discussion.

Figure 2:
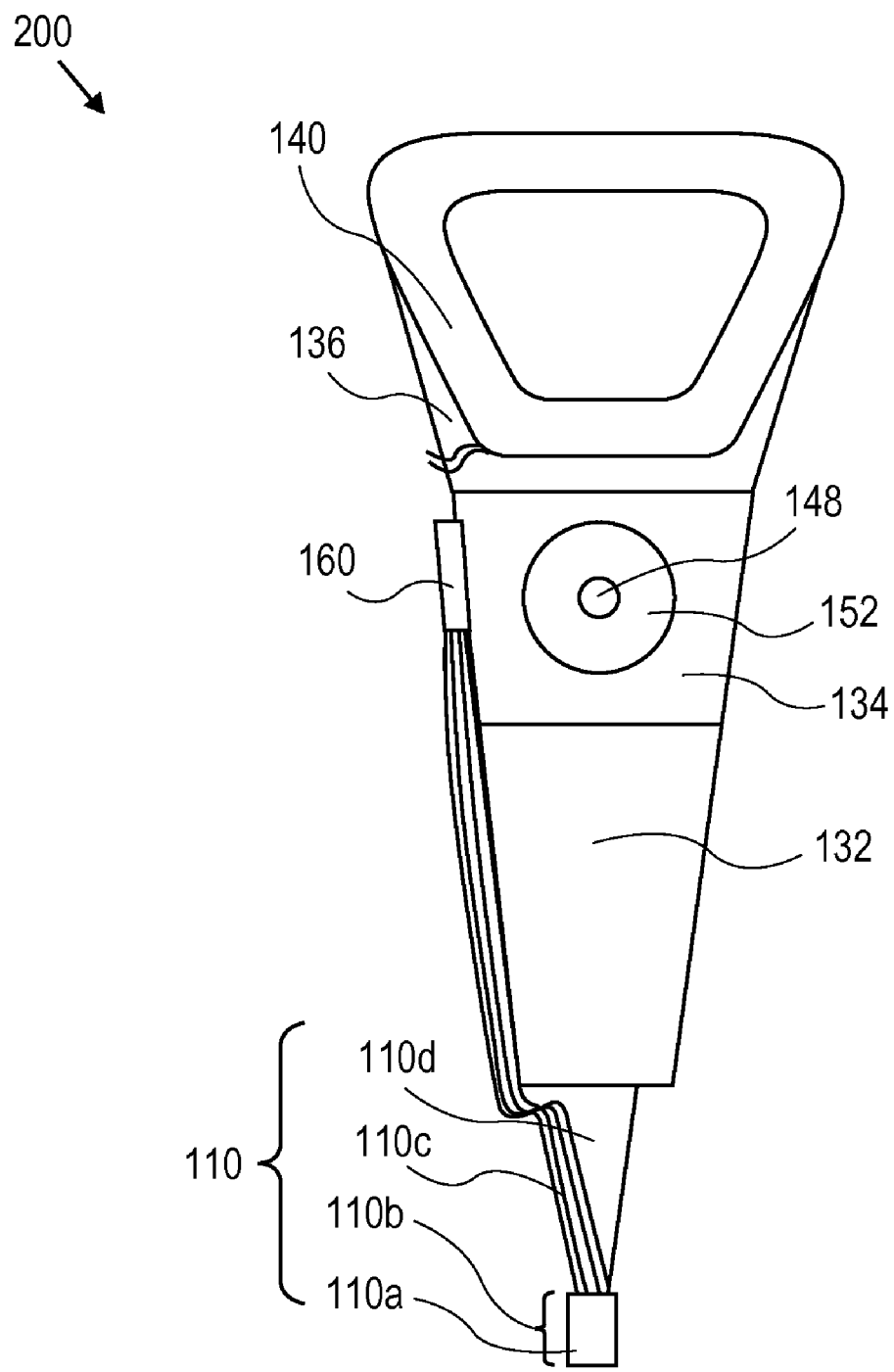
FIG. 2 is an illustration of a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Having described an illustrative description of HDD 100 according to an embodiment of the invention, information about integrating an upstream spoiler with a crash stop will now be presented.

An Integrated Upstream Spoiler and Crash Stop

Figure 3:
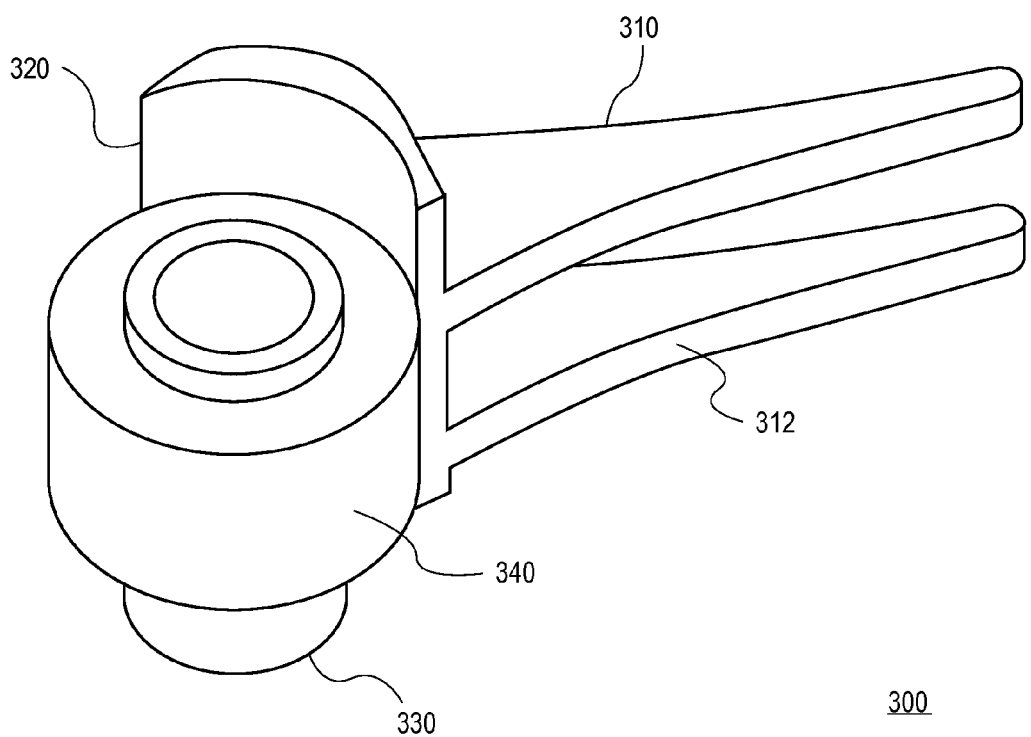
FIG. 3 is an illustration of a single integrated part comprising an upstream spoiler and a crash stop according to an embodiment of the invention.

FIG. 3 is an illustration of a single part 300 comprising an upstream spoiler and a crash stop according to an embodiment of the invention. Single part 300 may be used to perform the functions of both an upstream spoiler and a crash stop. Advantageously, the size and structure of single part 300 enables single part 300 to be installed within smaller spaces, and consequently small HDDs, than prior approaches for implementing upstream spoilers and crash stops.

As shown in FIG. 3, single part 300 includes spoiler wings 310 and 312. As is well-known to those in the art, spoiler wings 310 and 312 may be used to divert and reduce a flow of air, circulating within the interior of HDD 100 due to the rotation of one or more disks 120, from arm 132. While single part 300 is depicted in FIG. 3 as having two spoiler wings, single part 300 may include any number of spoiler wings. For example, the particular number of magnetic-recording disks in HDD 100 may influence, suggest, or dictate the particular number of spoiler wings in part 300. Moreover, the size and shape of the spoiler wings of part 300 may vary from implementation to implementation. For example, the size of spoiler wings 310 and 312 may reflect the shape of the arm 132.

In an embodiment, each of spoiler wings 310 and 312 are attached to spoiler base 320. Spoiler base 320 may be rotated around crash stop base 330, thus enabling spoiler wings 310 and 312 to be rotated around crash stop base 330. In this way, as shall be explained in further detail below, spoiler wings 310 and 312 may be rotated between one or more of disks 120 after single part 300 is affixed within HDD 100, thereby simplifying the installation of single part 300.

In an embodiment, crash stop base 330 and/or spoiler base 320 may have a structure which causes spoiler base 320 (and consequently spoiler wings 310 and 312) to be locked into place when spoiler base 320 is rotated into a desired position. For example, spoiler base 320 and crash stop base 330 may have complimentary grooves so that the grooves fit together when spoiler base 320 is aligned a certain way around crash stop base 330. Until spoiler base 320 is rotated into a desired position around crash stop base 330, the grooves of spoiler base 320 and crash stop base 330 allow the spoiler base 320 to rotate around crash stop base 330. However, when spoiler wings 310 and 312 are rotated into the desired position between one or more disks 120 during installation of single part 300 in HDD 100, the grooves the spoiler wings 310 and 312 become aligned and prevent any further movement of spoiler base 320, thereby locking spoiler base 320 into a fixed position. Such an embodiment facilitates ease of installation as spoiler base 320 need only be rotated until spoiler base 320 cannot be rotated further. Other embodiments of the invention may implement other structures or mechanisms to prevent spoiler base 320 from rotating any further around crash stop base 330 when a desired position is achieved, e.g., crash stop base 330 may have a groove or indentation in which a protrusion or portion of spoiler base 320 fits into when spoiler base 320 is in the desired position.

In an embodiment, spoiler wings 310 and 312, spoiler base 320, and crash base 330 may be constructed using a wide variety of materials, such as plastic or material similar to that used to construct the load/unload ramp within HDD 100.

As shown in FIG. 3, crash stop base 330 may be covered by a ring 340. Ring 340 is designed to prevent arm 132 from moving beyond single part 300 by providing a physical barrier to arm 132. In an embodiment, the crash stop implemented by single part 300 is an outer diameter (OD) crash stop that prevents arm 132 from moving beyond a specified distance from the outer diameter of the one or more disks 120.

In an embodiment, ring 340 may be constructed using a ring of rubber material having a desired derometer. Thus, ring 340 should have a derometer that prevents arm 132 from being damaged as well as prevents or minimize the introduction of harmful airborne particles into the interior of the HDD 100 that might occur through chipping or wear and tear of ring 340. Ring 340 may also be designed to minimize static friction between the crash stop and arm 132. For example, one approach for minimizing the static friction between the crash stop and arm 132 is to minimize the surface area that makes contact with arm 132 when arm 132 makes contact with the crash stop. A curved surface, such as ring 340, helps minimize the surface area of the crash stop that makes contact with arm 132.

While the crash stop of FIG. 3 is implemented using ring 340, other embodiments of the invention (not depicted) may implement the crash stop using other structures other than a ring. For example, certain embodiments may implement single part 300 such that the crash stop is implemented using a curved pad or a non-circular structure rather than using ring 340.

Ring 340 may be positioned or affixed on part 300 using a variety of different techniques. According to one approach, the shape of crash stop base 330 enables ring 340 to be slipped over crash stop base 330 after single part 330 is affixed to the interior of HDD 100. According to another approach, ring 340 may be positioned over or around crash stop base 330 prior to affixing single part 300 to HDD 100. Thus, ring 340 may be, but need not be, obtained from a different supplier than the manufacturer of the remainder portion of single part 300.

Having described the structure and manufacture of single part 300, the installation of single part 300 within HDD 100 shall now be explained in greater detail.

Installing the Integrated Upstream Spoiler and Crash Stop

Figure 4:
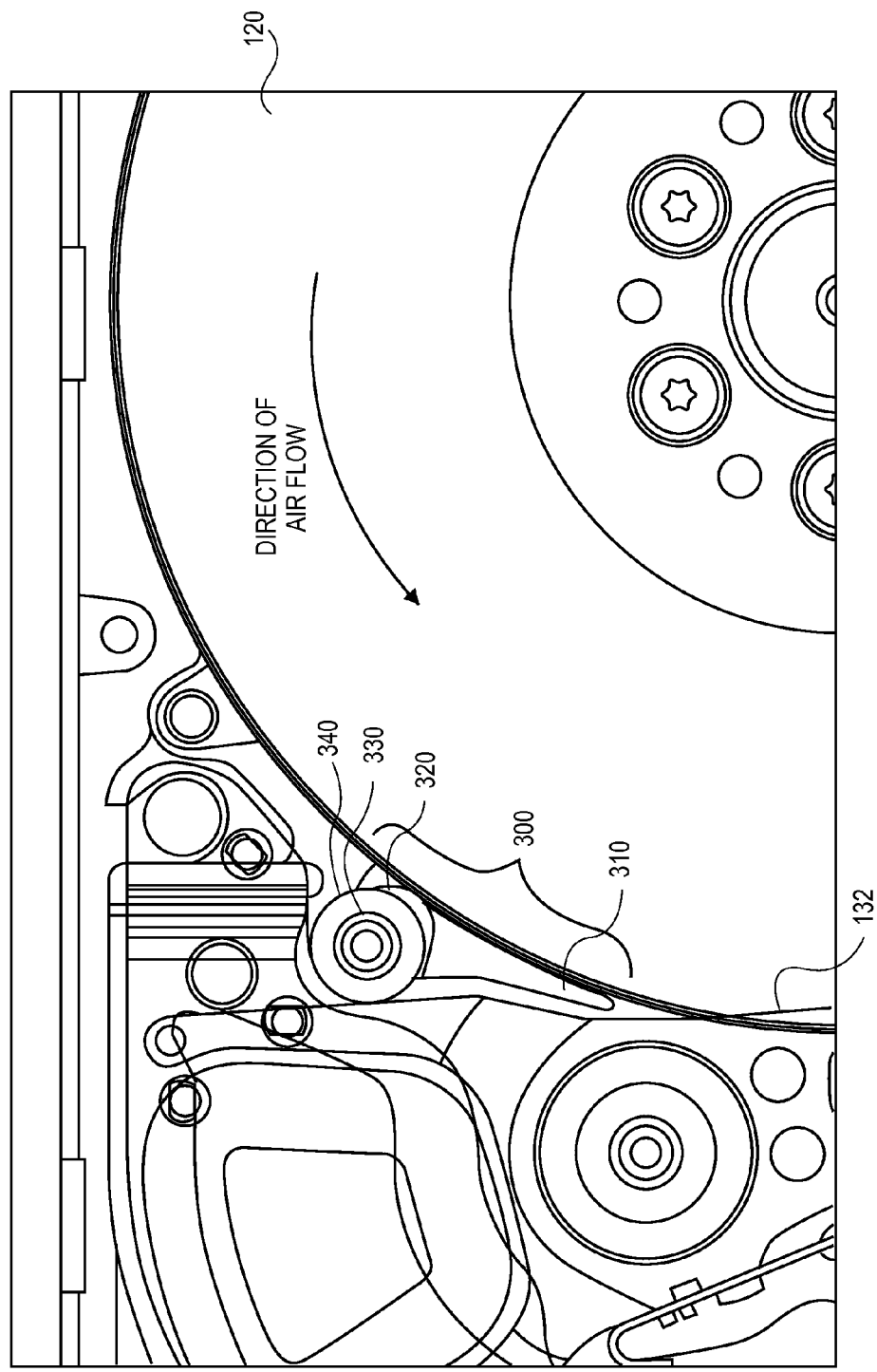
FIG. 4 is an illustration of an initial position of single part comprising an upstream spoiler and a crash stop after installation within an HDD according to an embodiment of the invention.

FIG. 4 is an illustration of an initial position of single part 300 after installation within HDD 100 according to an embodiment of the invention. As shown by FIG. 4, single part 300 may initially be affixed to HDD 100 such that the spoiler wings of single part 300 are not disposed between the one or more disks 120, thereby simplifying installation of single part 300.

Figure 5:
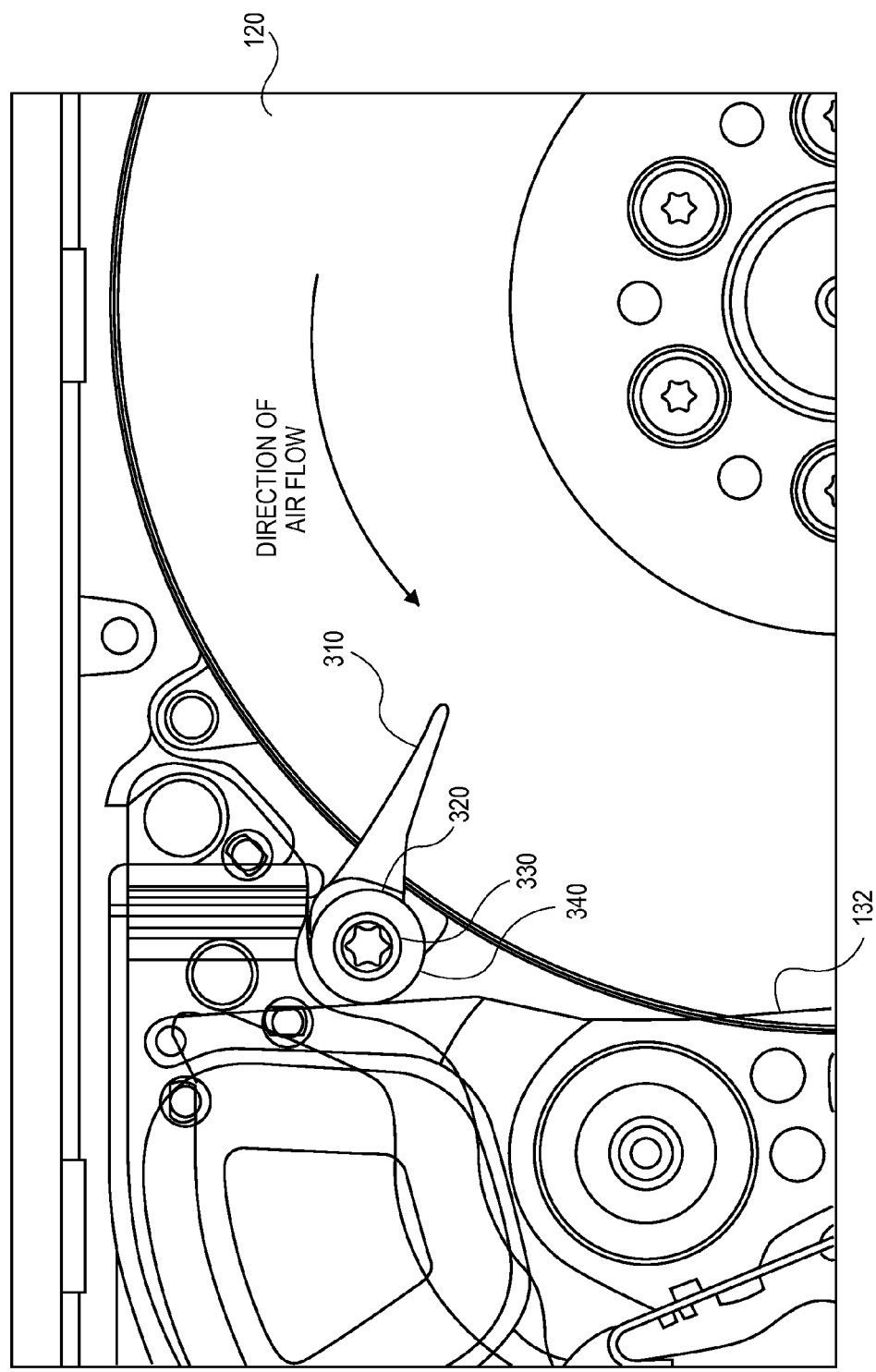
FIG. 5 is an illustration of a single part comprising an upstream spoiler and a crash stop after the spoiler wings have been rotated into a desired position according to an embodiment of the invention.

After single part 300 has been installed in HDD 100, the spoiler wings of single part 300 may be rotated between the one or more disks 120. To illustrate, consider FIG. 5, which is an illustration of single part 300 after the spoiler wings have been rotated into a desired position between one or more disks 120 according to an embodiment of the invention. In an embodiment, spoiler wings 130 and 132 may be, but need not be, locked into a fixed position once spoiler wings 130 and 132 are rotated into a desired position.

Spoiler wings may be rotated into a variety of different positions. The particular position into which the spoiler wings of single part 300 will be rotated will vary from implementation to implementation. For example, FIGS. 6A-C are illustrations of several illustrative positions of the spoiler wings of single part 300 according to embodiments of the invention. As shown by FIG. 6A, the spoiler wings of single part 300 may be rotated to have a position having an angle of attack $\alpha$ less than 90°. As shown by FIG. 6B, the spoiler wings of single part 300 may be rotated to have a position having an angle of attack $\alpha$ at or approximately around 90°. As shown by FIG. 6C, the spoiler wings of single part 300 may be rotated to have a position having an angle of attack $\alpha$ greater than 90°.

Advantageously, embodiments of the invention enable single part 300 to be implemented in smaller spaces or form factors than prior approaches having separate upstream spoilers and crash stops. Further, because of the savings in space, the upstream spoiler of single part 300 may have a large size than would otherwise be possible. Thus, embodiments of the invention also may be used to utilize the available space within HDD 100 to provide a larger spoiler wing, thereby better protecting arm 132 using the available space than prior approaches.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive (HDD), comprising:
   an enclosure;
   a magnetic-recording head;
   one or more magnetic-recording disks rotatably mounted on a spindle;
   a drive motor having a motor shaft attached to the spindle for rotating the one or more magnetic-recording disks;
   a voice-coil motor configured to move an actuator to allow the magnetic-recording head to access portions of the one or more magnetic-recording disks; and
   a single part comprising:
      an upstream spoiler having one or more wings, wherein the shape of the upstream spoiler diverts and reduces a flow of air away from the magnetic-recording head, and wherein the flow of air circulates within the enclosure due to the rotation of the one or more magnetic-recording disks, and
      a crash stop having a structure that prevents the actuator from moving beyond a particular location, wherein the crash stop includes a ring of rubber material having a desired derometer.

2. The hard-disk drive (HDD) of claim 1, wherein the single part has a structure which allows each of the one or more wings to be (a) rotated between the one or more magnetic-recording disks, and (b) locked into a fixed position once the one or more wings are rotated into a desired position.

3. The hard-disk drive (HDD) of claim 1, wherein the single part has a structure which enables the ring of rubber material to be slipped over a portion of the single part after the single part is affixed to the interior of the hard-disk drive (HDD).

4. The hard-disk drive (HDD) of claim 1, wherein the crash stop is designed to minimize static friction between the crash stop and the actuator.

5. The hard-disk drive (HDD) of claim 1, wherein the crash stop is an outer diameter (OD) crash stop which prevents the actuator from moving beyond a specified distance from the outer diameter of the one or more magnetic-recording disks.

6. The hard-disk drive (HDD) of claim 1, wherein the size of the one or more wings reflects the shape of the actuator.

7. The hard-disk drive (HDD) of claim 1, wherein the crash stop is the center of rotation for the one or more wings.

8. The hard-disk drive (HDD) of claim 1, wherein the single part has a structure which enables the one or more wings to be rotated to a plurality of different positions, wherein the plurality of different positions includes a first position that has an angle of attack $\acute{\alpha}$ less than 90° and a second position that has an angle of attack $\acute{\alpha}$ greater than 90°.

9. A single part for use within a hard-disk drive (HDD), comprising:
   an upstream spoiler having one or more wings, wherein the shape of the upstream spoiler diverts and reduces a flow of air away from a magnetic-recording head, and wherein the flow of air circulates within an enclosure of the hard-disk drive (HDD) due to the rotation of one or more magnetic-recording disks; and
   a crash stop having a structure that prevents an actuator from moving beyond a particular location, wherein the crash stop includes a ring of rubber material having a desired derometer.

10. The single part of claim 9, wherein the single part has a structure which allows each of the one or more wings to be (a) rotated between the one or more magnetic-recording disks, and (b) locked into a fixed position once the one or more wings are rotated into a desired position.

11. The single part of claim 9, wherein the single part has a structure which enables the ring of rubber material to be slipped over a portion of the single part after the single part is affixed to the interior of the hard-disk drive (HDD).

12. The single part of claim 9, wherein the crash stop is designed to minimize static friction between the crash stop and the actuator.

13. The single part of claim 9, wherein the crash stop is an outer diameter (OD) crash stop which prevents the actuator from moving beyond a specified distance from the outer diameter of the one or more magnetic-recording disks.

14. The single part of claim 9, wherein the size of the one or more wings reflects the shape of the actuator.

15. The single part of claim 9, wherein the single part has a structure which enables the one or more wings to be rotated to a plurality of different positions, wherein the plurality of different positions includes a first position that has an angle of attack $\acute{\alpha}$ less than 90° and a second position that has an angle of attack $\acute{\alpha}$ greater than 90°.

16. A method for manufacturing a single part for use within a hard-disk drive (HDD), comprising:
   constructing the part, wherein the single part comprises (a) an upstream spoiler having one or more wings, wherein the shape of the upstream spoiler diverts and reduces a flow of air away from a magnetic-recording head, and wherein the flow of air circulates within an enclosure of the hard-disk drive (HDD) due to the rotation of one or more magnetic-recording disks, and (b) a crash stop having a structure that prevents an actuator from moving beyond a particular location;
   prior to affixing the single part to the interior of the hard-disk drive (HDD), positioning a ring of material having a desired derometer on the single part to form the crash stop; and
   after affixing the single part to the interior of the hard-disk drive (HDD), rotating the one or more wings into a desired position.

17. A method for manufacturing a single part for use within a hard-disk drive (HDD), comprising:
   constructing the part, wherein the single part comprises (a) an upstream spoiler having one or more wings, wherein the shape of the upstream spoiler diverts and reduces a flow of air away from a magnetic-recording head, and wherein the flow of air circulates within an enclosure of the hard-disk drive (HDD) due to the rotation of one or more magnetic-recording disks, and (b) a crash stop having a structure that prevents an actuator from moving beyond a particular location;

after the single part has been affixed to the interior of the hard-disk drive (HDD), positioning a ring of material having a desired derometer on the crash stop; and after affixing the single part to the interior of the hard-disk drive (HDD), rotating the one or more wings into a desired position.

18. A hard-disk drive (HDD), comprising:

an enclosure;

a magnetic-recording head;

one or more magnetic-recording disks rotatably mounted on a spindle;

a drive motor having a motor shaft attached to the spindle for rotating the one or more magnetic-recording disks;

a voice-coil motor configured to move an actuator to allow the magnetic-recording head to access portions of the one or more magnetic-recording disks; and a single part comprising:

an upstream spoiler having one or more wings, wherein the shape of the upstream spoiler diverts and reduces a flow of air away from the magnetic-recording head, and wherein the flow of air circulates within the enclosure due to the rotation of the one or more magnetic-recording disks, and a crash stop having a structure that prevents the actuator from moving beyond a particular location, wherein the single part has a structure which allows each of the one or more wings to be (a) rotated between the one or more magnetic-recording disks, and (b) locked into a fixed and immovable position once the one or more wings are rotated into a desired position.

19. A single part for use within a hard-disk drive (HDD), comprising:

an upstream spoiler having one or more wings, wherein the shape of the upstream spoiler diverts and reduces a flow of air away from a magnetic-recording head, and wherein the flow of air circulates within an enclosure of the hard-disk drive (HDD) due to the rotation of one or more magnetic-recording disks; and a crash stop having a structure that prevents an actuator from moving beyond a particular location, wherein the single part has a structure which allows each of the one or more wings to be (a) rotated between the one or more magnetic-recording disks, and (b) locked into a fixed and immovable position once the one or more wings are rotated into a desired position.

* * * * *